US012735284B2

(12) United States Patent
Yamaguchi et al.

(10) Patent No.: US 12,735,284 B2
(45) Date of Patent: Sep. 15, 2026

(54) SHEET FEEDING APPARATUS, IMAGE FORMING APPARATUS, AND EXTENSION SUPPORT UNIT

(71) Applicant: CANON KABUSHIKI KAISHA, Tokyo (JP)

(72) Inventors: Shun Yamaguchi, Ibaraki (JP); Sho Ota, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/247,187

(22) Filed: Jun. 24, 2025

(65) Prior Publication Data

US 2026/0010108 A1 Jan. 8, 2026

(30) Foreign Application Priority Data

Jul. 8, 2024 (JP) ................................. 2024-109534

(51) Int. Cl.
*B65H 1/26* (2006.01)
*B65H 1/04* (2006.01)
*G03G 15/00* (2006.01)

(52) U.S. Cl.
CPC ............... *B65H 1/266* (2013.01); *B65H 1/04* (2013.01); *G03G 15/6514* (2013.01); *B65H 2405/11164* (2013.01); *B65H 2407/21* (2013.01); *B65H 2511/11* (2013.01)

(58) Field of Classification Search
CPC ................................ B65H 1/04; B65H 1/266; B65H 2405/11164; B65H 2407/21; B65H 2511/11; G03G 15/6514
See application file for complete search history.

(56) References Cited

U.S. PATENT DOCUMENTS 5,175,583 A * 12/1992 Noh .................. G03G 15/6552 271/223
5,975,520 A * 11/1999 Shim ........................ B65H 1/04 271/223
2017/0217222 A1* 8/2017 Sugiyama .............. B65H 31/02
2021/0094773 A1* 4/2021 Morita ..................... B65H 1/04

FOREIGN PATENT DOCUMENTS

JP 2017075013 A 4/2017

* cited by examiner

*Primary Examiner* — Prasad V Gokhale
(74) *Attorney, Agent, or Firm* — ROSSI, KIMMS & McDOWELL LLP

(57) ABSTRACT

A sheet feeding apparatus includes a sheet support unit, a feed unit, and an extension support unit. The inserted portion includes an opening portion that is larger than the insertion portion when viewed in the first direction and into which the insertion portion is inserted in the attached state, an engaged portion configured to engage and disengage with respect to the engagement portion in a second direction intersecting with the first direction and configured to position the extension support unit with respect to the sheet support unit in the first direction by engaging with the engagement portion in the attached state, a contacted portion configured to come into contact with the contact portion in a third direction intersecting with the first direction and the second direction, and an urging portion configured to urge the contact portion toward the contacted portion in the third direction.

13 Claims, 10 Drawing Sheets

SHEET FEEDING APPARATUS, IMAGE FORMING APPARATUS, AND EXTENSION SUPPORT UNIT

BACKGROUND

Field of the Technology

The present disclosure relates to a sheet feeding apparatus that feeds a sheet, an image forming apparatus that includes the sheet feeding apparatus, and an extension support unit that is applied to the sheet feeding apparatus.

Description of the Related Art

In recent years, there has been a yearly increase in a variety of media used in image forming apparatuses. A long sheet is one of those, and the image forming apparatuses are desired to be capable of printing on the long sheet with a length of approximately 1000 millimeters (mm) for sales promotional banners and the like. A configuration in which, in cases of feeding the long sheet as described above, the support of the long sheet is enabled by attaching extension sheet tray (extension support unit), which is a separate unit, with respect to a manual feed tray is known (refer to Japanese Patent Laid-Open No. 2017-075013). In this configuration, supporting platforms that are formed by bending a bar material into a substantially rectangular shape with one side open are elastically deformed to a frame member, which is supported by the extension sheet tray attached to the manual feed tray of an apparatus body, in a manner allowing for attachment and detachment.

The extension sheet trays tend to lengthen in a sheet lengthwise direction to support the long sheet. If the extension sheet trays remain attached in cases where the long sheet is not being fed, they may hinder accessibility and reduce workability during jam processing and the like. Therefore, it is desirable that a user can easily attach and detach the extension sheet trays as needed. On the other hand, if the extension sheet trays can be detached easily, there is a risk that the extension sheet trays may be detached from the manual feed tray and fall in cases where something comes into contact with the extension sheet trays. Therefore, the extension sheet trays are required to be held with respect to the manual feed tray with an adequate holding force that prevents them from detaching easily.

However, the extension sheet trays described in Japanese Patent Laid-Open No. 2017-075013 are attached to the frame member by elastically deforming the supporting platforms. Therefore, the workability for elastically deforming the supporting platforms during the attachment and detachment is not satisfactory.

SUMMARY the present disclosure is directed to provide a sheet feeding apparatus, an image forming apparatus, and an extension support unit that allow for the easy attachment and detachment of the extension support unit.

According to a first aspect of the present disclosure, a sheet feeding apparatus includes a sheet support unit including a sheet supporting surface configured to support a sheet, a feed unit configured to feed the sheet supported on the sheet supporting surface, and an extension support unit configured to be detachably attached to the sheet support unit in a first direction, the extension support unit including an extension supporting surface that is positioned upstream of the sheet supporting surface in a sheet feeding direction and is configured to support the sheet in an attached state in which the extension support unit is attached to the sheet support unit. The sheet support unit includes an insertion portion that includes an engagement portion and a contact portion. The extension support unit includes an inserted portion. The inserted portion includes an opening portion that is larger than the insertion portion when viewed in the first direction and into which the insertion portion is inserted in the attached state, an engaged portion configured to engage and disengage with respect to the engagement portion in a second direction intersecting with the first direction and configured to position the extension support unit with respect to the sheet support unit in the first direction by engaging with the engagement portion in the attached state, a contacted portion configured to come into contact with the contact portion in a third direction intersecting with the first direction and the second direction, and an urging portion configured to urge the contact portion toward the contacted portion in the third direction.

According to a second aspect of the present disclosure, an image forming apparatus includes the sheet feeding apparatus, and an image forming unit configured to form an image on a sheet.

According to a third aspect of the present disclosure, an extension support unit configured to be attached and detached in a first direction to a sheet support unit including a sheet supporting surface configured to support a sheet includes an extension supporting surface configured to support the sheet by being positioned upstream of the sheet supporting surface in a sheet feeding direction in an attached state in which the extension support unit is attached to the sheet support unit, and an inserted portion. The inserted portion includes an opening portion that is larger than an insertion portion of the sheet support unit when viewed in the first direction and into which the insertion portion is inserted in the attached state, an engaged portion configured to engage and disengage with respect to an engagement portion of the insertion portion in a second direction intersecting with the first direction and configured to position the extension support unit with respect to the sheet support unit in the first direction by engaging with the engagement portion in the attached state, a contacted portion configured to come into contact with a contact portion of the insertion portion in a third direction intersecting with the first direction and the second direction in the attached state, and an urging portion configured to urge the contact portion toward the contacted portion in the third direction.

Features of the present disclosure will become apparent from the following description of embodiments with reference to the attached drawings. The following description of embodiments is described by way of example.

DESCRIPTION OF THE EMBODIMENTS

Figure 1:
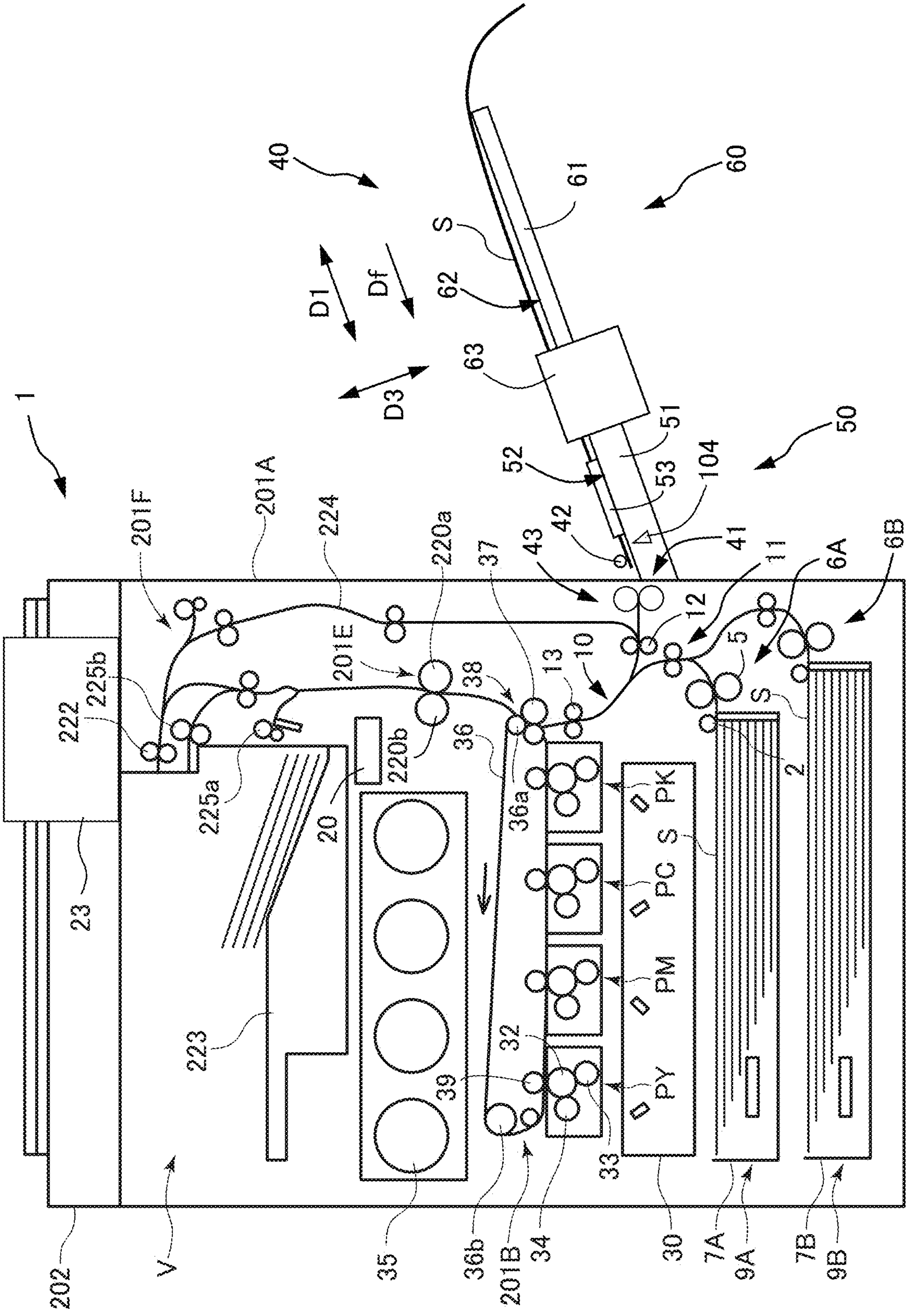
FIG. 1 is a cross-sectional view illustrating an image forming apparatus according to this embodiment.

Hereinafter, this embodiment will be described using diagrams. First, using FIG. 1, a schematic configuration of an image forming apparatus 1 according to this embodiment will be described. FIG. 1 is a cross-sectional view from a front side, illustrating the schematic configuration of the image forming apparatus 1 according to this embodiment. The image forming apparatus 1 is a tandem type laser beam printer of an intermediate transfer system, utilizing an electrophotographic process. The image forming apparatus 1 can form and output a full color or monochrome image on a sheet S based on print image data that are output from a host apparatus 24 (refer to FIG. 2) connected to a control unit 20.

Image Forming Apparatus

The image forming apparatus 1 includes an apparatus body 201A and an image forming unit 201B that forms the image on the sheet S. On top of the apparatus body 201A, an image reading apparatus 202, which is installed substantially horizontally, is disposed. Between the image reading apparatus 202 and the apparatus body 201A, a sheet discharge space V for sheet discharge is formed.

Sheet Feed Unit

The sheet S is stored in feed cassettes 7A and 7B of cassette sheet feed units 9A and 9B according to, for example, size, or is supported on a manual sheet feed portion 40.

The cassette sheet feed units 9A and 9B include the feed cassettes 7A and 7B that store the sheet S, and sheet feed units 6A and 6B that feed the sheet S from the cassettes 7A and 7B. While the sizes of the sheet S stored in the cassette sheet feed units 9A and 9B are different, the configurations of the feed units 6A and 6B are the same, so that the sheet feed unit 6A will be described herein. The sheet feed unit 6A includes a pickup roller 2 and a separation roller pair 5, which includes a feed roller and a retard roller for the separation of the sheet S sent from the pickup roller 2. The sheet S separated into one sheet at a time by the separation roller pair 5 is conveyed to a registration roller pair 13 by a first pre-registration roller pair 11.

The manual sheet feed portion 40 is an example of a sheet feeding apparatus, and includes a manual sheet feed unit 50, a feed unit 41, and an extension unit 60. In this embodiment, in the manual sheet feed unit 50, a direction in which the supported sheet S is fed is referred to as a sheet feeding direction Df, a direction parallel to the sheet feeding direction Df is referred to as an attachment/detachment direction D1, and a direction aligned with a width direction for the supported sheet S is referred to as a sheet width direction D2. Further, a direction which intersects (for example, perpendicularly intersects) with a sheet supporting surface 52, described below, is referred to as a sheet supporting direction D3, and is substantially vertical in this embodiment. The attachment/detachment direction D1, the sheet width direction D2, and the sheet supporting direction D3 are respectively examples of a first direction, a second direction intersecting with the first direction, and a third direction intersecting with the first and second directions.

The manual sheet feed unit 50 is an example of a sheet support unit, and includes a manual feed tray 51 and the sheet supporting surface 52 formed on an upper surface of the manual feed tray 51 and configured to support the sheet S. The manual sheet feed unit 50 can be freely opened and closed by pivoting with respect to the apparatus body 201A, and can be moved between a closed and an open position. In addition, the manual sheet feed unit 50 is disposed to be capable of being attached to and detached from the apparatus body 201A. The manual feed tray 51 supports the sheet S supported on the sheet supporting surface 52 with the manual sheet feed unit 50 opened. In addition, side regulation plates 53 that are arranged on the sheet supporting surface 52 and regulate positions of both ends of the supported sheet S in the sheet width direction D2 are disposed on the manual feed tray 51. In these side regulation plates 53, for example, a separation air blower fan unit, not shown, is disposed.

The feed unit 41 feeds the sheet S supported on the sheet supporting surface 52 of the manual feed tray 51 to a pre-registration roller pair 12. The feed unit 41 includes a pickup roller 42 and a separation roller pair 43, which includes a feed roller and a retard roller, for the separation of the sheet S sent from the pickup roller 42. The sheet S, which has been separated into one sheet at a time by the separation roller pair 43, is conveyed to the registration roller pair 13 by the second pre-registration roller pair 12.

The extension unit 60 is an example of an extension support unit, and is detachably attached with respect to the manual sheet feed unit 50 in the attachment/detachment direction D1. The extension unit 60 includes an extension tray 61, which, in an attached state of being attached to the manual sheet feed unit 50, is positioned more upstream than the manual feed tray 51 in the sheet feeding direction Df. An upper surface of the extension tray 61 includes an extension supporting surface 62 which is positioned more upstream in the sheet feeding direction Df than the sheet supporting surface 52 in the attached state and supports the sheet S. The extension unit 60 will be described below.

In this embodiment, the extension unit 60 is described as being attached to the manual sheet feed unit 50 and as a part of the image forming apparatus 1. However, it is not limited to this, and the extension unit 60 may be regarded as an optional device that is not included in the image forming apparatus 1. To be noted, in this embodiment, a state illustrated in FIG. 1 in which the extension unit 60 is attached to the manual sheet feed unit 50 is referred to as the attached state. In addition, a state in which the extension unit 60 is detached from the manual sheet feed unit 50 is referred to as a detached state.

Image Forming Unit

The image forming unit 201B forms the image on the sheet S, which is fed from the cassette sheet feed units 9A and 9B or the manual sheet feed unit 50 and is conveyed by the registration roller pair 13. The image forming unit 201B includes four process cartridges PY, PM, PC, and PK, respectively forming the toner images of four colors: yellow (Y), magenta (M), cyan (C), and black (K), an exposure unit 30, and an intermediate transfer belt 36. The four process cartridges PY, PM, PC, and PK are identical in configuration except for differences in the colors of the images they form. Therefore, only a configuration and an image forming process of the process cartridge PY will be described herein, and the description of the process cartridges PM, PC, and PK will be omitted. In addition, the image forming unit 201B includes a secondary transfer portion 38 and a fixing unit 201E arranged above the process cartridges PY, PM, PC, and PK. Toner cartridges 35 supply the toner to developing rollers 34.

The process cartridge PY includes a photosensitive drum 32, which is electrophotographic photoreceptor of a drum type, a charge roller 33, and the developing roller 34. The photosensitive drum 32 is rotatably supported by the image forming apparatus 1, and is rotatably driven by a driving means, not shown. The photosensitive drum 32 is constructed by forming photoconductive layers, such as an organic photoconductor (OPC), on an outer circumferential surface of an aluminum cylinder. The charge roller 33 charges the photosensitive drum 32. The charge roller 33 includes a core metal and a conductive elastic member surrounding the core metal, and is rotatably driven by being arranged to come into contact with a surface of the photosensitive drum 32, while applying a charging bias by a power supply, not shown. The developing rollers 34 respectively apply the toners of different colors (yellow, magenta, cyan, and black) onto the surface of the photosensitive drum 32 for each process cartridge PY, PM, PC, and PK. The developing roller 34 forms the toner image on the surface of the photosensitive drum 32 by developing an electrostatic latent image through applying the toner onto the electrostatic latent image on the surface of the photosensitive drum 32.

The exposure unit 30 houses a laser light source that emits laser light inside a casing, and various optical members that guide the laser light emitted from the laser light source to the corresponding photosensitive drum 32 to perform deflection scanning. The exposure unit 30 emits the laser light based on the image information to the surface of the photosensitive drum 32, which has been charged, and forms the electrostatic latent image.

The secondary transfer portion 38 includes the intermediate transfer belt 36 wound around a drive roller 36*a* and a tension roller 36*b*. A primary transfer roller 39, which comes into contact with the intermediate transfer belt 36 at a position that faces the photosensitive drum 32 is disposed inside the intermediate transfer belt 36. Here, the intermediate transfer belt 36 is rotated in an arrow direction in FIG. 1 by the drive roller 36*a*, which is driven by a driving unit, not shown. At a position opposite the drive roller 36*a* of the secondary transfer portion 38, a secondary transfer roller 37, which transfers the color image formed on the intermediate transfer belt 36 onto the sheet S, is disposed.

The fixing unit 201E is arranged above the secondary transfer roller 37, and a first sheet discharge roller pair 225*a*, a second sheet discharge roller pair 225*b*, and a duplex reverse portion 201F are arranged above this fixing unit 201E. The duplex reverse portion 201F is an example of a reconveyance portion. The duplex reverse portion 201F reverses the front and back sides of the sheet S, on which the image has been formed by the image forming unit 201B, and conveys the sheet S to the second pre-registration roller 12. The duplex reverse portion 201F includes a reverse roller pair 222 that can rotate forward and reverse, and a reconveyance path 224 that again conveys the sheet S, on whose first surface the image has been formed, to the image forming unit 201B. In an upper part of the image forming apparatus 1, an operation unit 23 that receives an operation from a user is disposed. As the operation unit 23, a touch panel system incorporating both a display function and an input function is applied. The operation unit 23 is connected to the control unit 20, and receives various user input operations related to the sheet used for printing, such as size information, grammage data, and surface property details, as well as execution or interruption commands for printing.

Control System

Figure 2:
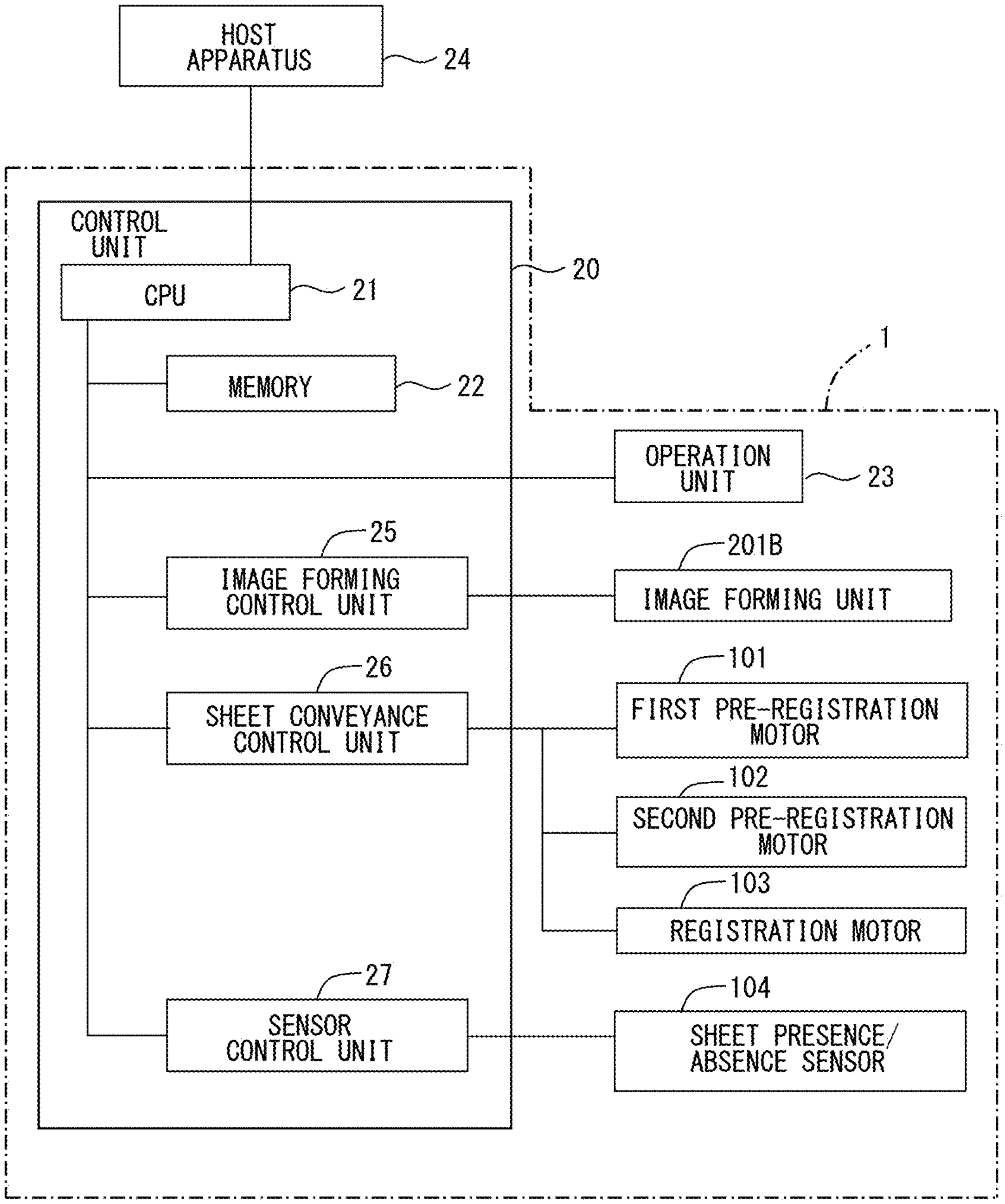
FIG. 2 is a block diagram illustrating a control system of the image forming apparatus according to this embodiment.

Next, using FIG. 2, the control unit 20 and a control system of the image forming apparatus 1 will be described. The control unit 20 includes various functional units, such as a central processing unit (CPU) 21, a memory 22, an image forming control unit 25, a sheet conveyance control unit 26, and a sensor control unit 27. The CPU 21 implements various operations performed by the image forming apparatus 1 through the execution of predetermined control programs and the like. The memory 22 is, for example, a random access memory (RAM), a read only memory (ROM), and the like, and stores various programs and various data in predetermined storage areas.

The image forming control unit 25 issues commands to the image forming unit 201B including the exposure unit 30, and controls image formation. The sheet conveyance control unit 26 issues commands to a first pre-registration motor 101, a second pre-registration motor 102, a registration motor 103, and the like, and controls the conveyance of the sheet S by controlling the drive of various conveyance rollers. The sensor control unit 27 controls the start and stop of the detection of a sheet presence/absence sensor 104 and the like, and receives detection results of each sensor. To be noted, it is also possible to configure to receive various information related to the sheet used for printing from, for example, the host apparatus 24, such as a personal computer, an image scanner, and facsimile, connected via a network.

Image Forming Operation

Next, an image forming operation of the image forming apparatus 1 will be described. First, when the image forming apparatus 1 receives image data of a document, which are to be printed, such image information is converted into electrical signals subsequent to image processing, and is transmitted to the exposure unit 30 of the image forming unit 201B. In the image forming unit 201B, the surface of the photosensitive drum 32, which has been uniformly charged to a predetermined polarity and potential by the charge roller 33, is sequentially exposed by the laser light. Thereby, the electrostatic latent images of yellow, magenta, cyan, and black are sequentially formed on the photosensitive drums 32 of each process cartridge PY, PM, PC, and PK, respectively.

Thereafter, this electrostatic latent images are developed using the toners of each color and visualized, and the toner images of each color on each photosensitive drum 32 are sequentially overlapped and transferred onto the intermediate transfer belt 36 with primary transfer biases applied to the primary transfer rollers 39. Thereby, the toner image is formed on the intermediate transfer belt 36.

In addition, in parallel with this image forming operation, the sheet S is fed one sheet at a time from the cassette sheet feed units 9A and 9B or the manual sheet feed unit 50. The sheet S fed from the cassette sheet feed units 9A and 9B passes through the first pre-registration roller pair 11, and is conveyed to the registration roller pair 13. The skew of the sheet S is corrected by the first pre-registration roller pair 11 and the registration roller pair 13. In particular, a leading edge of the sheet S that is conveyed is abutted against a nip portion of the registration roller pair 13 that is stopping. The first pre-registration roller pair 11 further conveys the sheet S, and corrects the skew by forming a loop. Similarly, the sheet S fed from the manual sheet feed unit 50 passes through the second pre-registration roller pair 12, and is conveyed to the registration roller pair 13. The skew of the sheet S is corrected by the second pre-registration roller pair 12 and the registration roller pair 13. In this embodiment, the first pre-registration roller pair 11, the second pre-registration roller pair 12, and the registration roller pair 13 are collectively referred to as a skew feed correcting portion 10.

The registration roller pair 13 conveys the sheet S to the secondary transfer portion 38 in synchronization with the timing for transferring the toner image on the intermediate transfer belt 36 onto the sheet S. In the secondary transfer portion 38, by applying a secondary transfer bias to the secondary transfer roller 37, the toner image is collectively transferred onto the sheet S.

Next, the sheet S onto which the toner image has been transferred is conveyed to the fixing unit 201E, and, by receiving heat and pressure at a roller nip portion formed by a pressing roller 220*a* and a heating roller 220*b*, the toners of each color are melted and mixed, so that the toner image is fixed on the sheet S as the color image. The sheet S, on which the image has been fixed, is discharged to the sheet discharge space V by the first or second sheet discharge roller pair 225*a* or 225*b* disposed downstream of the fixing unit 201E, and is supported on a sheet discharge tray 223 projecting from a bottom surface of the sheet discharge space V.

On the other hand, in a case of forming the image on both sides of the sheet S, the reverse roller pair 222 is reversed after being temporarily stopped with a trailing edge of the sheet S retaining a predetermined distance to the reverse roller pair 222, and, thereafter, the sheet S is passed through the second pre-registration roller pair 12 via the reconveyance path 224. Then, the skew correction is performed by conveying the sheet S again to the registration roller pair 13, and the image forming unit 201B performs the image formation and fixes for the second time.

Manual Sheet Feed Unit

Figure 3:
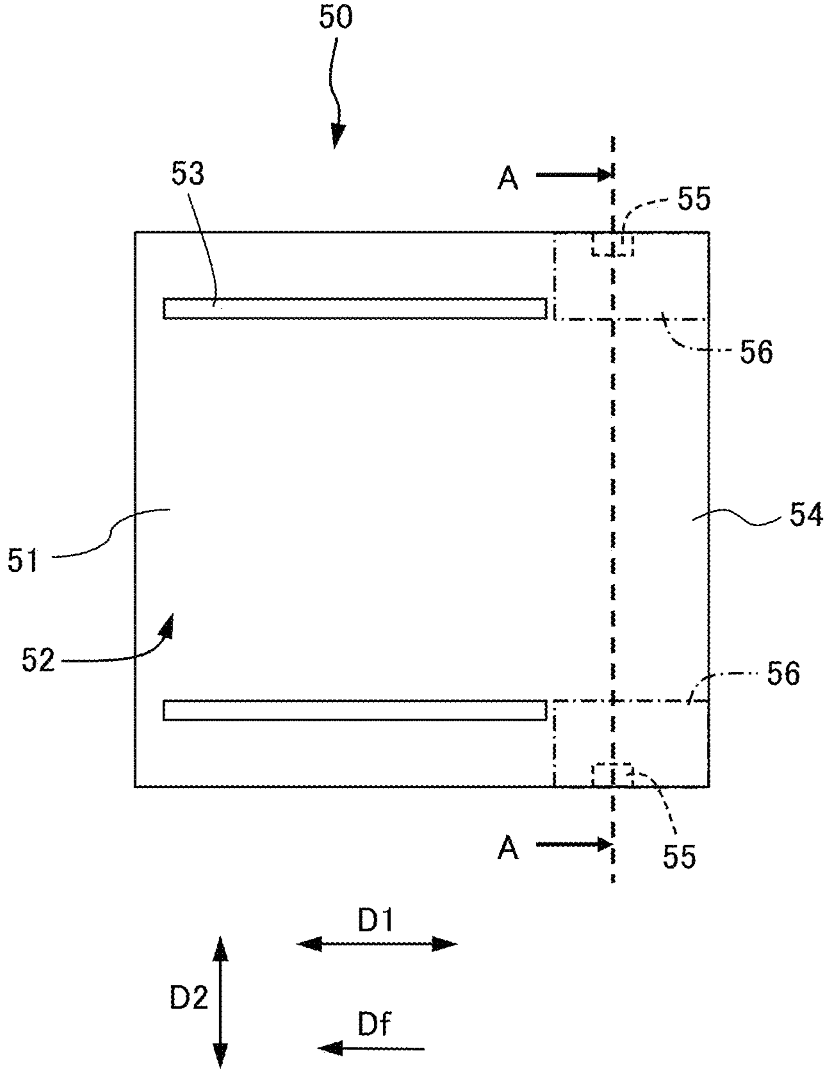
FIG. 3 is a plan view illustrating a manual sheet feed unit according to this embodiment.
Figure 4A:
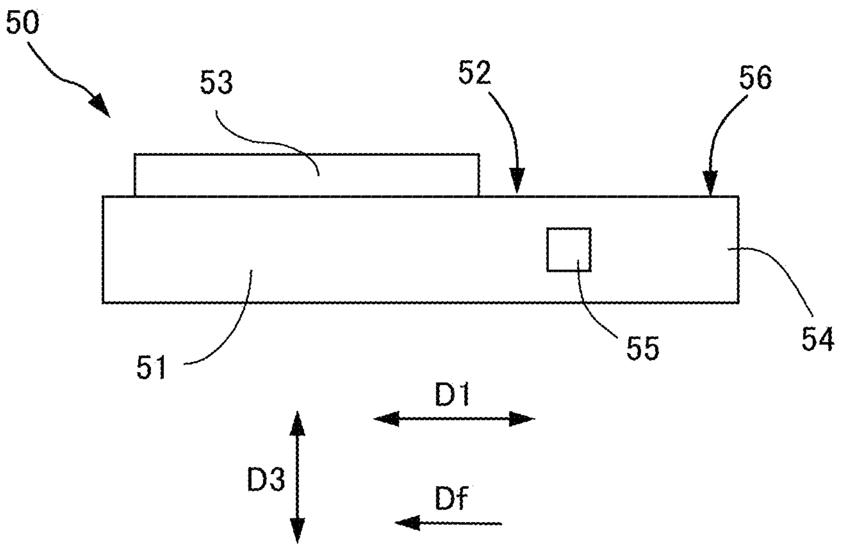
FIG. 4A is a front view illustrating the manual sheet feed unit according to this embodiment.
Figure 4B:
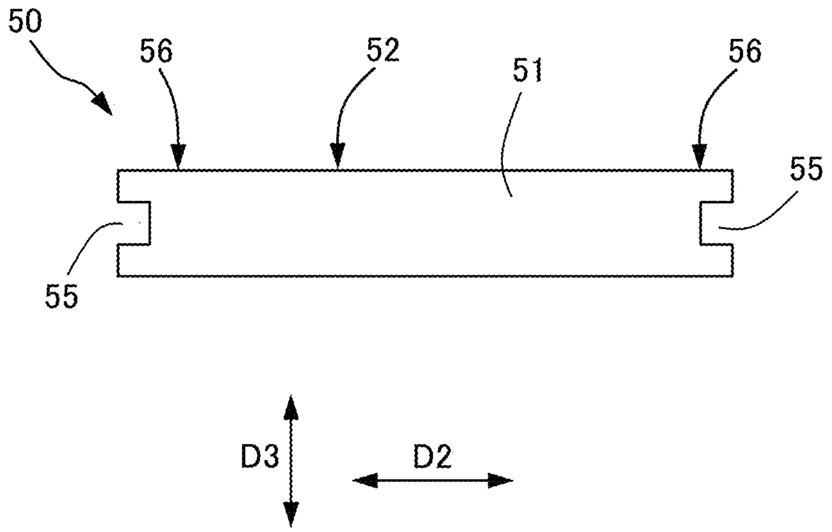
FIG. 4B is a cross-sectional view illustrating the manual sheet feed unit according to this embodiment, taken along the line A-A of FIG. 3.

Next, using FIGS. 3 to 4B, the manual sheet feed unit 50 of the manual sheet feed portion 40 will be described. FIG. 3 is a plan view illustrating the manual sheet feed unit 50, FIG. 4A is a front view illustrating the manual sheet feed unit 50, and FIG. 4B is a cross-section view illustrating the manual sheet feed unit 50 taken along the line A-A of FIG. 3. The manual sheet feed unit 50 includes an insertion portion 54 to which the extension unit 60 is attached. The insertion portion 54 includes recess portions 55 recessed in the sheet width direction D2 and contact surfaces 56 which are at least part of an upper surface of the manual feed tray 51. The insertion portion 54 is configured by an upstream part of the manual feed tray 51 in the sheet feeding direction Df. The contact surfaces 56 are examples of a contact portion, and, when viewed in a supporting direction D3, are arranged at non-overlapping positions with respect to the sheet supporting surface 52 (refer to FIG. 3). In this embodiment, the contact surfaces 56 are formed at both end portions of the manual feed tray 51 in the sheet width direction D2. The recess portions 55 are examples of an engagement portion, are formed at both the end portions of the manual feed tray 51 in the sheet width direction D2 with a shape that is recessed toward a central portion of the manual feed tray 51 in the sheet width direction D2. In the attached state, projecting portions 64, described below, engage with these recess portion 55 in the sheet width direction D2 (refer to FIG. 8C).

Extension Unit

Figure 5:
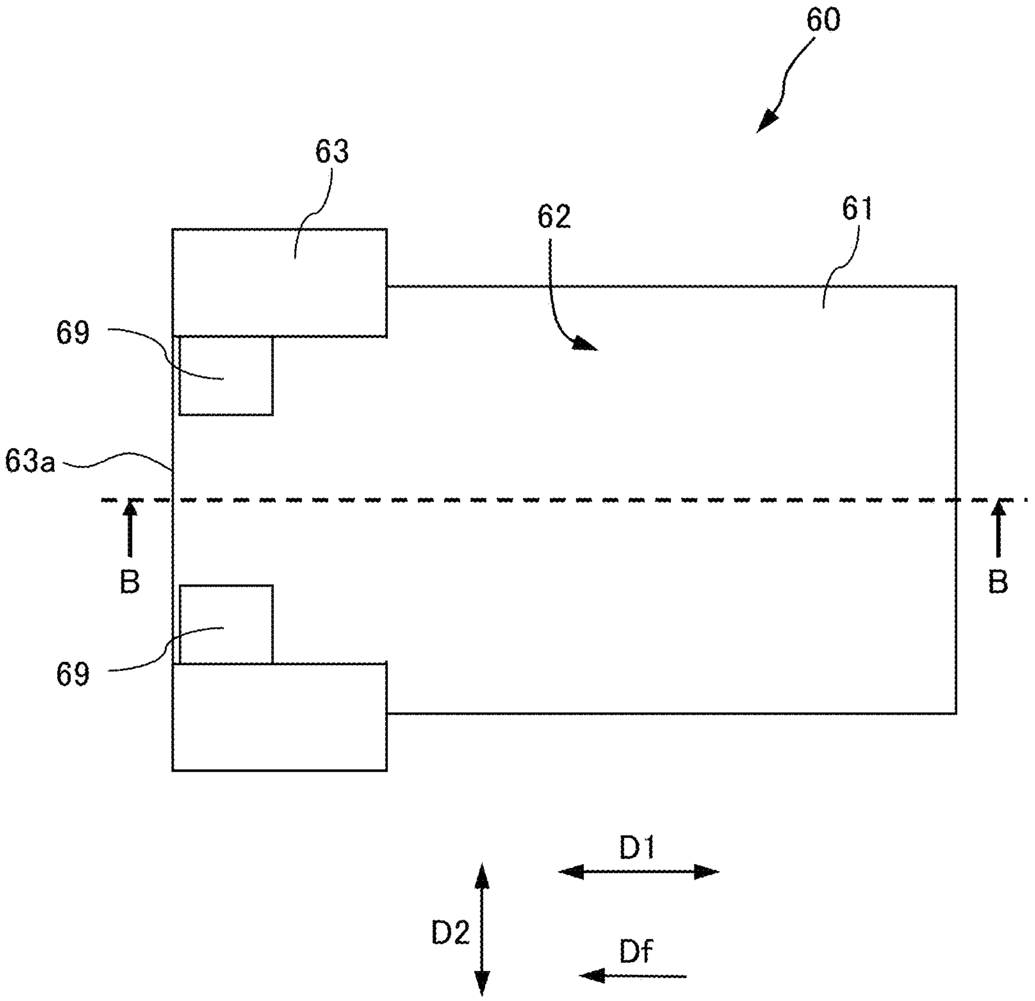
FIG. 5 is a plan view illustrating an extension unit according to this embodiment.
Figure 6A:
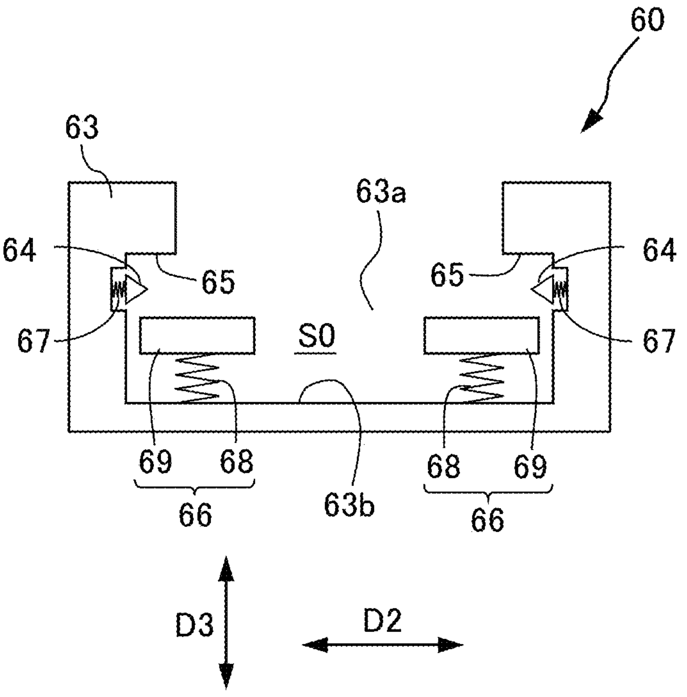
FIG. 6A is a side view illustrating the extension unit according to this embodiment.
Figure 6B:
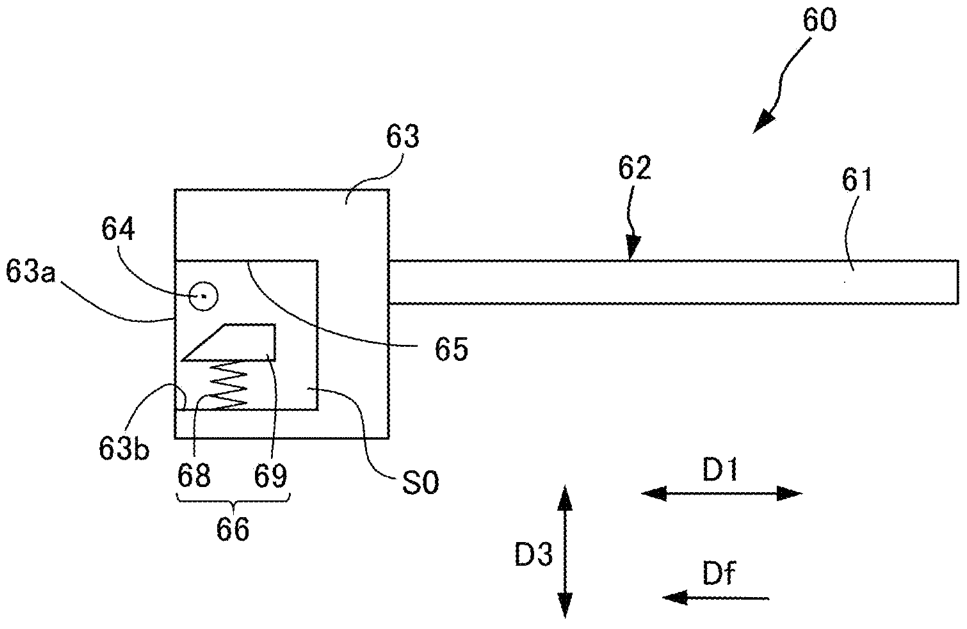
FIG. 6B is a cross-sectional view illustrating the extension unit according to this embodiment, taken along the line B-B of FIG. 5.
Figure 7:
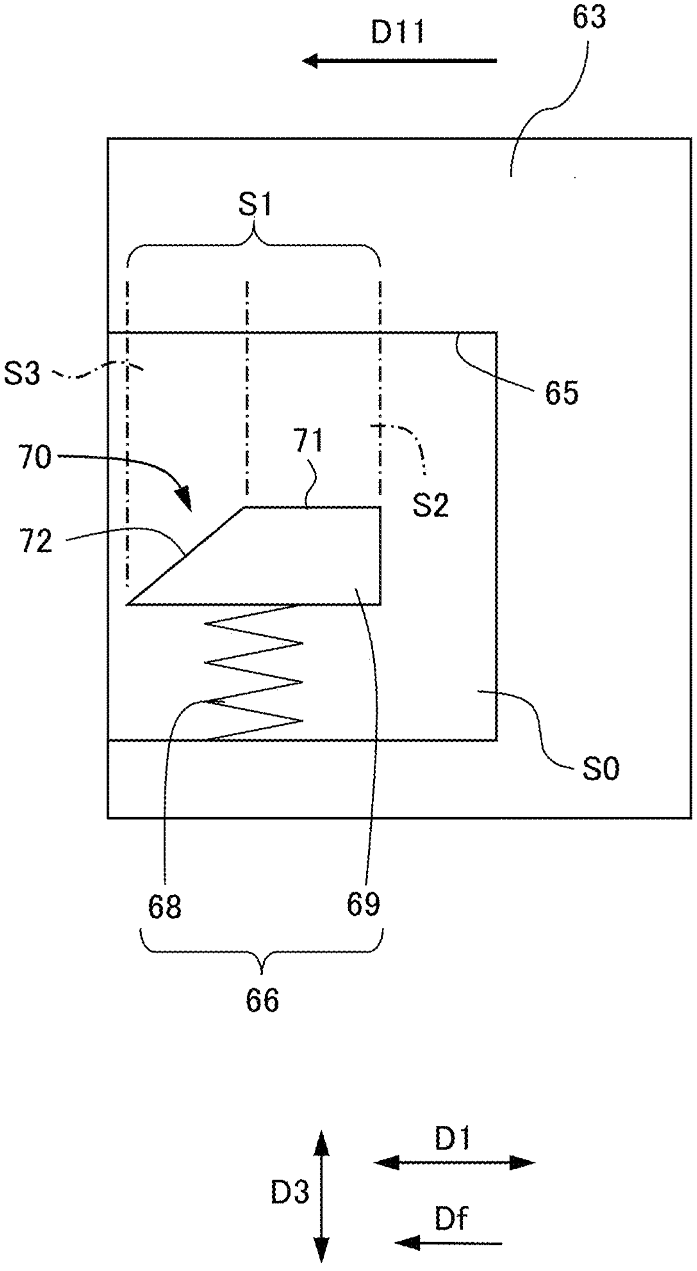
FIG. 7 is a cross-sectional view illustrating an internal space of a frame body according to this embodiment.

Next, using FIGS. 5 to 7, the extension unit 60 of the manual sheet feed portion 40 will be described. FIG. 5 is a plan view illustrating the extension unit 60, FIG. 6A is a side view illustrating the extension unit 60 when viewed from a downstream side in the sheet feeding direction Df, and FIG. 6B is a cross-sectional view illustrating the extension unit 60 taken along the line B-B of the FIG. 5. FIG. 7 is a cross-sectional view illustrating an internal space SO of a frame body 63. The extension unit 60 includes the frame body 63 on a downstream side of the extension tray 61 in the sheet feeding direction Df. The frame body 63 is an example of an inserted portion, includes an opening portion 63*a* that is larger than the insertion portion 54 when viewed in the attachment/detachment direction D1, and the insertion portion 54 is inserted into the opening portion 63*a* in the attached state. As illustrated in FIG. 6A, when viewed from the downstream side in the sheet feeding direction Df, the frame body 63 is in a substantially rectangular shape with a central portion in the sheet feeding direction Df of an upper wall being open. In addition, the frame body 63 includes the internal space SO into which the insertion portion 54 is inserted. This internal space SO is formed by a plurality of space forming surfaces. The space forming surfaces include at least an upper surface and a lower surface.

The frame body 63 includes the projecting portions 64 that engage with the recess portions 55 of the manual sheet feed unit 50, contacted surfaces 65 with which the contact surfaces 56 of the manual sheet feed unit 50 come into contact, and urging portions 66. The projecting portions 64 are examples of an engaged portion, and are arranged at both end portions of the frame body 63 in the sheet width direction D2. Each of the projecting portions 64 is configured to engage and disengage with respect to the recess portions 55 in the sheet width direction D2, and, by engaging with the recess portion 55 in the attached state, positions the extension unit 60 with respect to the manual sheet feed unit 50 in the attachment/detachment direction D1. In this embodiment, the projecting portion 64 possesses a substantially conical shape that projects in the sheet width direction D2 toward the recess portion 55 in the attached state, and is arranged with an apex of the substantially conical shape directed toward the recess portion 55. The extension unit 60 includes urging springs 67, which are examples of a second urging spring. The urging springs 67 include, for example, a compression coil spring, are interposed between the projecting portions 64 and the frame body 63, and urge the projecting portions 64 toward the center side in the sheet width direction D2.

The contacted surfaces 65 are examples of a contacted portion, and, in the attached state, come into contact with respect to the contact surfaces 56 of the manual sheet feed unit 50 in the supporting direction D3. The contacted surfaces 65 are formed on lower surfaces of the upper wall of the frame body 63, and arranged at both the end portions of the frame body 63 in the sheet width direction D2. That is, the contacted surfaces 65 correspond to the upper surface among the plurality of space forming surfaces that form the internal space SO. The contacted surfaces 65 are arranged at non-overlapping positions with respect to the extension supporting surface 62 in the second direction when viewed in the supporting direction D3.

The urging portions 66 urge the contact surfaces 56 toward the contacted surfaces 65 in the supporting direction D3. In this embodiment, in the attached state, the urging portions 66 are arranged beneath the insertion portion 54, and urge the contact surfaces 56 with respect to the contacted surfaces 65 toward an upward direction along the supporting direction D3. The urging portion 66 includes an urging spring 68 and a pushing member 69. The urging spring 68 is an example of a first urging spring, includes, for example, a compression coil spring, and is disposed with respect to a lower surface 63*b* among the space forming surfaces forming the internal space SO. In the attached state, the pushing members 69 bring the contact surfaces 56 into contact with the contacted surfaces 65 by pushing the insertion portion 54 with the urging springs 68.

Here, as illustrated in FIG. 7, an inserted space S1 is an example of an inserted space portion formed between the contacted surfaces 65 and the pushing member 69 in the internal space SO of the frame body 63. The inserted space S1 includes a pushing space S2 serving as an example of a pushing space portion and an introducing space S3 serving as an example of an introducing space portion. The pushing space S2 is a space in which, in the attached state, the insertion portion 54 is positioned between the contacted surfaces 65 and the pushing members 69 such that the contact surfaces 56 push the contacted surfaces 65 (refer to FIG. 8C). The introducing space S3 is positioned downstream of the pushing space S2 in the sheet feeding direction Df, and is configured such that it is wider in a vertical direction on a downstream side than an upstream side in the sheet feeding direction Df. The introducing space S3 is a space that, in a case where the extension unit 60 transitions from a detached state (FIG. 8A) of being detached from the manual sheet feed unit 50 to the attached state (refer to 8C), introduces an upstream end portion in the sheet feeding direction Df of the insertion portion 54 into the pushing space S2.

The pushing member 69 includes an upper surface portion 70 which opposes a side of the insertion portion, namely the contacted surface 65, in the attached state. The upper surface portion 70 includes a first region 71 and a second region 72. The first region 71 is a region that forms the pushing space S2 in the attached state. The second region 72 is a region that is disposed downstream of the first region 71 in the sheet feeding direction Df and forms the introducing space S3, and is formed such that its downstream side is distanced from the contacted surface 65 compared to its upstream side in the sheet feeding direction Df. In this embodiment, the second region 72 is an inclined surface inclined with respect to the sheet feeding direction Df. However, the second region 72 is not limited to a planar inclined surface, and may also be an inclined curved surface in its entirety.

Attachment/Detachment Operation

Figure 8A:
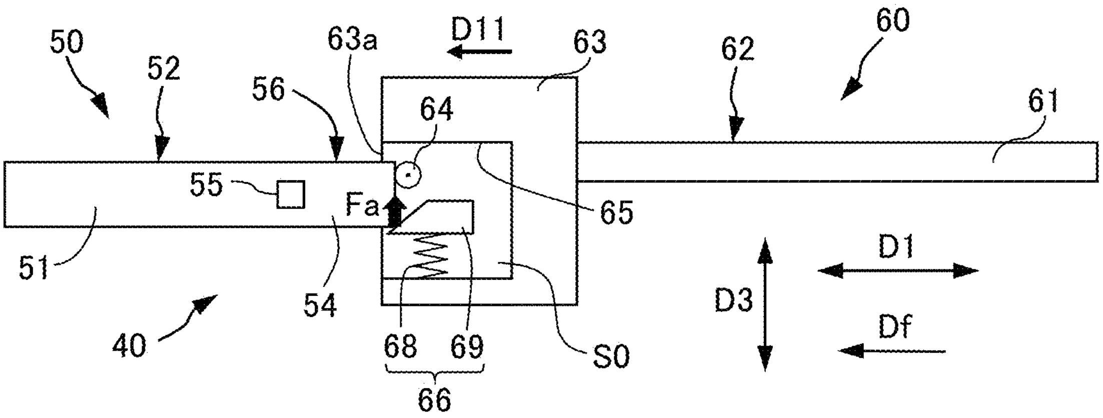
FIG. 8A is a cross-sectional view illustrating the manual sheet feed unit and the extension unit according to this embodiment immediate before the extension unit is attached to the manual sheet feed unit.
Figure 8B:
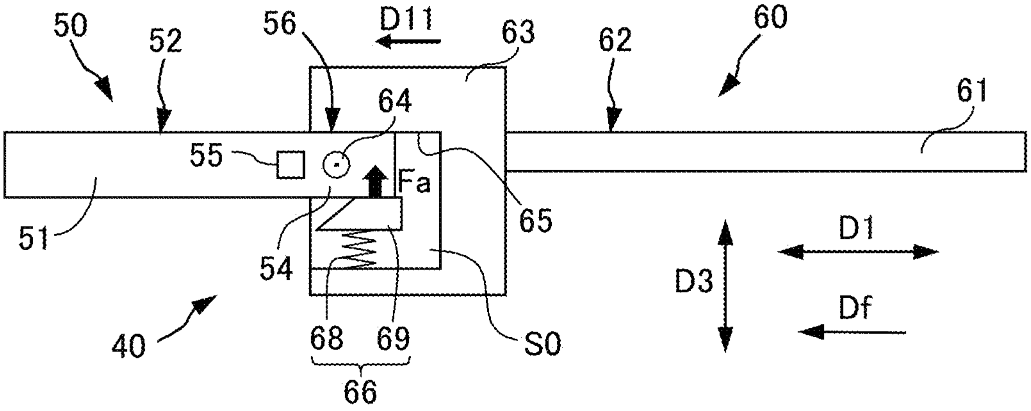
FIG. 8B is a cross-sectional view illustrating the manual sheet feed unit and the extension unit according to this embodiment during the attachment of the extension unit to the manual sheet feed unit.

Next, using FIGS. 8A to 10, an operation to attach and detach the extension unit 60 with respect to the manual sheet feed unit 50 will be described. As illustrated in FIG. 8A, when the extension unit 60 is moved in an attachment direction D11 (sheet feeding direction Df) for attachment with respect to the manual sheet feed unit 50, the second region 72 (FIG. 7) of the pushing member 69 of the extension unit 60 comes into contact with a leading edge of the insertion portion 54 of the manual sheet feed tray 50. When the urging springs 68 are pushed via the pushing member 69, an urging force Fa in an upward direction is applied to the insertion portion 54 of the manual sheet feed unit 50. When the manual sheet feed unit 50 is pushed upward by the urging force Fa, as illustrated in FIG. 8B, the extension unit 60 can move in the attachment direction D11 while maintaining a contact state between the contact surface 56 of the insertion portion 54 and the contacted surface 65 of the extension unit 60.

Figure 8C:
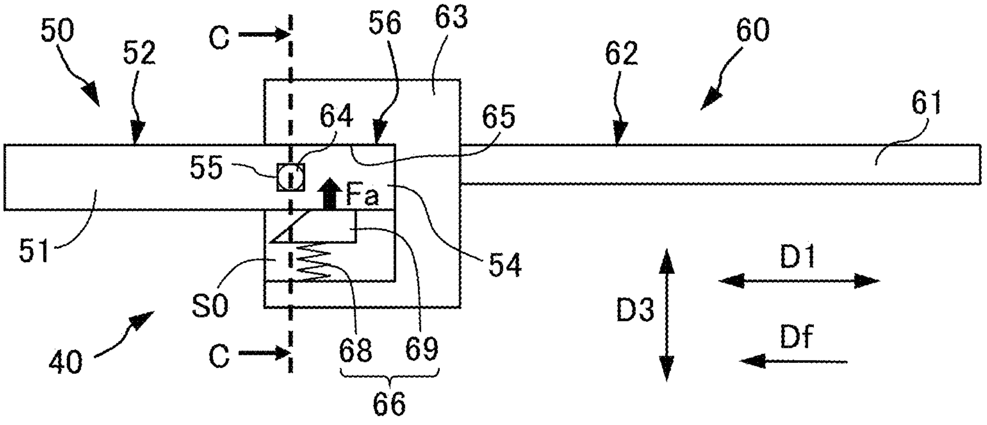
FIG. 8C is a cross-sectional view illustrating the manual sheet feed unit and the extension unit according to this embodiment after the extension unit has been attached to the manual sheet feed unit.
Figure 9:
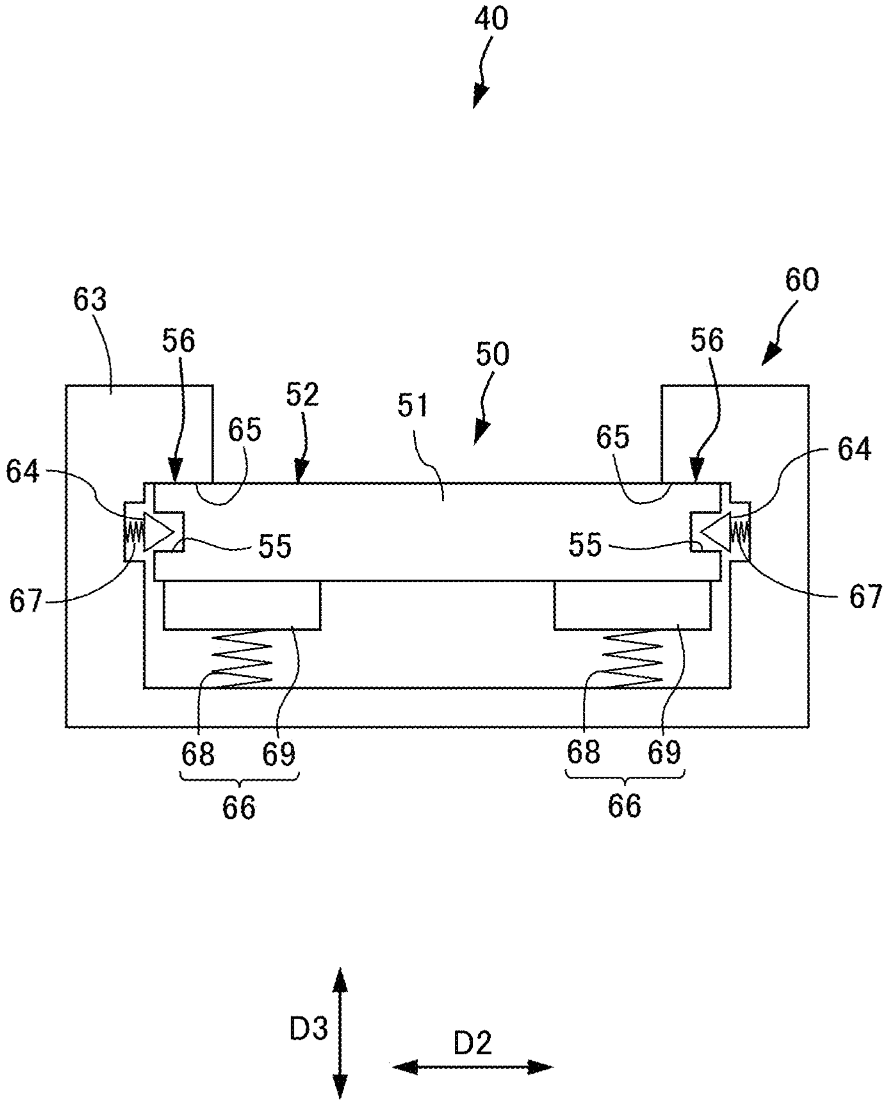
FIG. 9 is a cross-sectional view illustrating the manual sheet feed unit and the extension unit according to this embodiment, taken along the line C-C of FIG. 8C.

FIG. 8C is a diagram illustrating a state in which the attachment operation of the extension unit 60 has been completed, and FIG. 9 is a cross-sectional view illustrating the state taken along the line C-C of the FIG. 8C. In the state in which the extension unit 60 is attached to the manual sheet feed unit 50, when the projection portions 64 of the extension unit 60 enter the recess portions 55 of the manual sheet feed unit 50 by the urging forces of the urging springs 67, the extension unit 60 is held by the manual sheet feed unit 50. In addition, in the attached state, the extension supporting surface 62 is positioned on an extended plane of the sheet supporting surface 52. Thereby, the sheet S, which is supported across the sheet supporting surface 52 and the extension supporting surface 62, can be supported flatly and smoothly fed.

Here, in cases where the urging portion 66 does not exist, the urging force Fa in the upward direction is not generated during the attachment operation of the extension unit 60, so that a vertical relative position between the extension unit 60 and the manual sheet feed unit 50 is not uniquely determined. In this case, even if the extension unit 60 is moved completely in the attachment direction D11, there is a possibility that the projecting portions 64 of the extension unit 60 and the recess portions 55 of the manual sheet feed unit 50 may not engage due to misalignment in vertical positions. Therefore, there is a possibility that extension unit 60 may not be held by the manual sheet feed unit 50. In contrast, in this embodiment, by disposing the urging portions 66, the vertical alignment of the projecting portions 64 and the recess portions 55 can be easily achieved, and, thereby, it is possible to prevent the occurrence of the state in which the extension unit 60 is not held by the manual sheet feed unit 50.

Here, the extension sheet trays described in Japanese Patent Laid-Open No. 2017-075013 are attached to the frame member by elastically deforming the supporting platforms. Therefore, the workability for elastically deforming the supporting platforms during the attachment and detachment is not satisfactory, and there is a risk that, depending on positions and directions of external forces acting on the supporting platforms, the supporting platforms may undergo elastic deformation and detach. In this embodiment, the extension unit 60 allows for the easy attachment and detachment of the extension support unit while ensuring that the extension unit 60 does not easily detach after being attached.

Holding Mechanism

Figure 10:
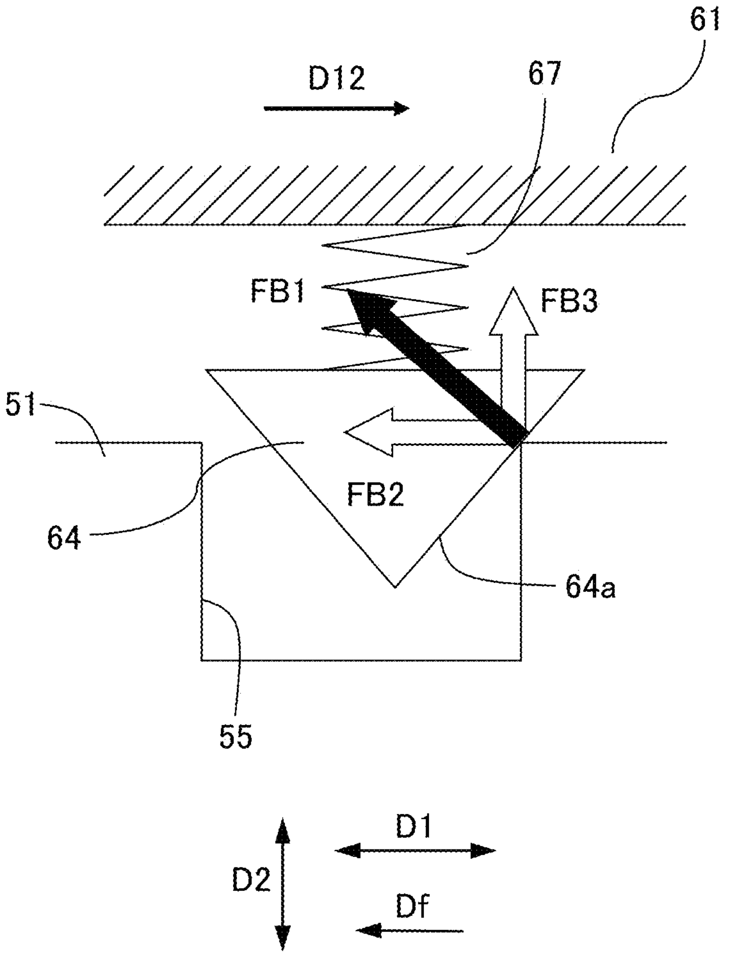
FIG. 10 is a cross-sectional view illustrating a projection portion and a recess portion in an attached state according to this embodiment.

Next, using FIG. 10, a configuration to hold the extension unit 60, which is attached to the manual sheet feed unit 50, to prevent detachment will be described. FIG. 10 is an enlarged view illustrating a holding mechanism of the extension unit 60 by the projecting portion 64 of the extension unit 60 and the recess portion 55 of the manual sheet feed unit 50. When the extension unit 60 is moved in a detachment detection D12 (opposite to the sheet feeding direction Df) for detachment, the inclined surface portion 64*a* of the projecting portion 64 and an edge of the recess portion 55 comes into contact. At this time, a force FB1 perpendicular to the inclined surface portion 64*a* is exerted on the projecting portion 64. The force FB1 can be decomposed into a component force FB2 that is parallel to the detachment direction D12, and a component force FB3 that is perpendicular to the detachment direction D12. Since the component force FB2 is a force that resists the detachment of the extension unit 60, the extension unit 60 is held by the manual sheet feed unit 50 with the component force FB2.

In addition, since the component force FB3 is a force that pushes the projecting portion 64 while resisting the urging spring 67, when the component force FB3 is larger than the urging force exerted by the urging spring 67 of the projecting portion 64, the projecting portion 64 can be released from the recess portion 55. In other words, while it is possible to detach the extension unit 60 when a force that causes the component force FB3 to become larger than the urging force of the urging spring 67 through the projecting portion 64 is applied to the extension unit 60, it is not possible to detach the extension unit 60 with a force that causes the component force FB3 to become less than the urging force of the urging spring 67 through the projecting portion 64. That is, in a case where the extension unit 60 transitions from the attached state to the detached state, the projecting portion 64 comes into contact with the edge of the recess portion 55 using the inclined surface portion 64*a*, and is pushed to a side opposite to the recess portion in the sheet width direction D2 while resisting the urging spring 67. As described above, by modifying the urging force exserted by the urging spring 67 of the projecting portion 64 and the gradient of the inclined surface portion 64*a* of the projecting portion 64, it is possible to design the holding force of the extension unit 60 with respect to the manual sheet feed unit 50.

As described above, according to the image forming apparatus 1 of this embodiment, the extension unit 60 can be attached and detached by an easy operation of simply inserting the extension unit 60 into the manual sheet feed unit 50, and, after the attachment, by the holding mechanism, which uses the projecting portion 64 and the recess portion 55, it is possible to ensure that the extension unit 60 does not easily detach.

In addition, according to the image forming apparatus 1 of this embodiment, the frame body 63 of the extension unit 60 includes the urging portions 66. Therefore, it is possible to easily align the vertical positions of the projecting portions 64 and the recess portions 55 when attaching the extension unit 60 to the manual sheet feed unit 50, and is possible to prevent occurrences where the extension unit 60 is not held by the manual sheet feed unit 50. That is, by regulating a posture of the manual sheet feed unit 50 during the attachment of the extension unit 60, it is possible to perform a guided attachment in which the projecting portions 64 of the extension unit 60 and the recess portions 55 of the manual sheet feed unit 50 are guided to be engaged.

According to the present disclosure, the extension support unit can be easily attached and detached, while ensuring a secure attachment once attached.

OTHER EMBODIMENTS

While, in the embodiment described above, the attachment/detachment direction D1 is parallel to the sheet feeding direction Df, it is not limited to this. For example, the attachment/detachment direction may be configured to be not parallel to the sheet feeding direction Df, and may be configured to be the supporting direction of the sheet S. In addition, while, in the embodiment described above, the projecting portions 64 are disposed in the extension unit 60 and the recess portions 55 are disposed in the manual sheet feed unit 50, it is not limited to this, and the projecting portions may be disposed in the manual sheet feed unit 50 and the recess portions may be disposed in the extension unit 60. In addition, while the recess portions and the projecting portions are cited as examples for the engagement and engaged portions, it is not limited to this, and a broad range of standard engagement configurations can be applied.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-109534, filed Jul. 8, 2024 which is hereby incorporated by reference herein in its entirety.

What is claimed is:

1. A sheet feeding apparatus comprising:

a sheet support unit including a sheet supporting surface configured to support a sheet;

a feed unit configured to feed the sheet supported on the sheet supporting surface; and an extension support unit configured to be detachably attached to the sheet support unit in a first direction, the extension support unit including an extension supporting surface that is positioned upstream of the sheet supporting surface in a sheet feeding direction and is configured to support the sheet in an attached state in which the extension support unit is attached to the sheet support unit, wherein the sheet support unit includes an insertion portion that includes an engagement portion and a contact portion, wherein the extension support unit includes an inserted portion, and wherein the inserted portion includes:

an opening portion that is larger than the insertion portion when viewed in the first direction and into which the insertion portion is inserted in the attached state;

an engaged portion configured to engage and disengage with respect to the engagement portion in a second direction intersecting with the first direction and configured to position the extension support unit with respect to the sheet support unit in the first direction by engaging with the engagement portion in the attached state;

a contacted portion configured to come into contact with the contact portion in a third direction intersecting with the first direction and the second direction; and an urging portion configured to urge the contact portion toward the contacted portion in the third direction.

2. The sheet feeding apparatus according to claim 1, wherein the first direction is a direction that is parallel to the sheet feeding direction.

3. The sheet feeding apparatus according to claim 2, wherein the second direction is a sheet width direction, and wherein the third direction is a direction perpendicular to the sheet supporting surface.

4. The sheet feeding apparatus according to claim 3, wherein the contact portion is arranged at a position that does not overlap with respect to the sheet supporting surface in the second direction when viewed in the third direction, wherein the contacted portion is arranged at a position that does not overlap with respect to the extension supporting surface in the second direction when viewed in the third direction, and wherein the extension supporting surface is positioned on an extended plane of the sheet supporting surface in the attached state.

5. The sheet feeding apparatus according to claim 4, wherein the urging portion is arranged beneath the insertion portion in the attached state, and is configured to urge the contact portion with respect to the contacted portion toward an upward direction along the third direction.

6. The sheet feeding apparatus according to claim 5, wherein the urging portion includes:

a first urging spring disposed in the inserted portion with respect to a lower surface among space forming surfaces that form an internal space into which the insertion portion is inserted; and a pushing member configured to bring the contact portion into contact with the contacted portion by pushing the insertion portion with the first urging spring in the attached state.

7. The sheet feeding apparatus according to claim 6, wherein an inserted space portion formed between the contacted portion and the pushing member in the internal space includes:

a pushing space portion in which the insertion portion is positioned between the contacted portion and the pushing member such that the contact portion pushes the contacted portion in the attached state; and an introducing space portion positioned downstream of the pushing space portion in the sheet feeding direction, being wider in the third direction on a downstream side than an upstream side in the sheet feeding direction, and configured to introduce an upstream end portion in the sheet feeding direction of the insertion portion into the pushing space portion in a case where the extension support unit transitions from a detached state detached from the sheet support unit to the attached state.

8. The sheet feeding apparatus according to claim 7, wherein the pushing member includes an upper surface portion that faces a side of the insertion portion in the attached state, and wherein the upper surface portion includes:

a first region forming the pushing space portion between the contacted portion in the attached state; and a second region disposed downstream of the first region in the sheet feeding direction, forming the introducing space portion, and formed such that a downstream side in the sheet feeding direction is more separated from the contacted portion than an upstream side in the sheet feeding direction is separated from the contacted portion.

9. The sheet feeding apparatus according to claim 8, wherein the second region is an inclined surface inclined with respect to the sheet feeding direction.

10. The sheet feeding apparatus according to claim 3, wherein the engaged portion is a projecting portion projecting toward the engagement portion in the second direction in the attached state, and wherein the engagement portion is a recess portion with which the projecting portion is configured to engage in the second direction in the attached state.

11. The sheet feeding apparatus according to claim 10, wherein the extension support unit includes a second urging spring disposed between the projecting portion and the inserted portion and configured to urge the projecting portion to the recess portion in the second direction, wherein the projecting portion includes an inclined surface portion, and wherein in a case where the extension support unit transitions from the attached state to a detached state detached from the sheet support unit, the inclined surface portion is configured to push the projecting portion to a side opposite to the recess portion in the second direction while resisting the second urging spring by coming into contact with an edge of the recess portion.

12. An image forming apparatus comprising:

the sheet feeding apparatus according to claim 1; and an image forming unit configured to form an image on a sheet.

13. An extension support unit configured to be attached and detached in a first direction to a sheet support unit including a sheet supporting surface configured to support a sheet, the extension support unit comprising:

an extension supporting surface configured to support the sheet by being positioned upstream of the sheet supporting surface in a sheet feeding direction in an attached state in which the extension support unit is attached to the sheet support unit; and an inserted portion, wherein the inserted portion includes:

an opening portion that is larger than an insertion portion of the sheet support unit when viewed in the first direction and into which the insertion portion is inserted in the attached state;

an engaged portion configured to engage and disengage with respect to an engagement portion of the insertion portion in a second direction intersecting with the first direction and configured to position the extension support unit with respect to the sheet support unit in the first direction by engaging with the engagement portion in the attached state;

a contacted portion configured to come into contact with a contact portion of the insertion portion in a third direction intersecting with the first direction and the second direction in the attached state; and an urging portion configured to urge the contact portion toward the contacted portion in the third direction.

* * * * *